(12) United States Patent
Watanabe

(10) Patent No.: US 10,922,977 B2
(45) Date of Patent: Feb. 16, 2021

(54) DISPLAY CONTROL DEVICE

(71) Applicant: AISIN SEIKI KABUSHIKI KAISHA, Kariya (JP)

(72) Inventor: Hiroyuki Watanabe, Chiryu (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 50 days.

(21) Appl. No.: 16/025,150

(22) Filed: Jul. 2, 2018

(65) Prior Publication Data

US 2019/0027041 A1 Jan. 24, 2019

(30) Foreign Application Priority Data

Jul. 19, 2017 (JP) .................................. 2017-139756

(51) Int. Cl.
| | |
|---|---|
| *G08G 1/16* | (2006.01) |
| *H04N 7/18* | (2006.01) |
| *H04N 13/111* | (2018.01) |
| *B62D 15/02* | (2006.01) |
| *G06K 9/00* | (2006.01) |
| *G08G 1/0962* | (2006.01) |

(52) U.S. Cl.
CPC ......... *G08G 1/168* (2013.01); *B62D 15/0285* (2013.01); *G06K 9/00805* (2013.01); *G06K 9/00812* (2013.01); *G08G 1/09626* (2013.01); *H04N 7/18* (2013.01); *H04N 7/181* (2013.01); *H04N 13/111* (2018.05)

(58) Field of Classification Search
CPC .. G06K 9/00805; G06K 9/00812; H04N 7/18; H04N 7/181; H04N 13/111; G08G 1/168; G08G 1/09626; B62D 15/0285
See application file for complete search history.

(56) References Cited

U.S. PATENT DOCUMENTS

| | | | |
|---|---|---|---|
| 2002/0080017 A1* | 6/2002 | Kumata ................. | G08G 1/168 340/436 |
| 2007/0279493 A1* | 12/2007 | Edanami ................ | G08G 1/168 348/148 |
| 2011/0234802 A1* | 9/2011 | Yamada ................. | G03B 15/02 348/148 |

(Continued)

FOREIGN PATENT DOCUMENTS

JP 2015-76645 A 4/2015

*Primary Examiner* — Maria E Vazquez Colon
(74) *Attorney, Agent, or Firm* — Sughrue Mion, PLLC

(57) ABSTRACT

A display control device includes: an acquisition section that acquires captured image data items from imaging sections that image a surrounding region of a vehicle; a display control section that displays first bird's-eye view image data representing surroundings of the vehicle from a bird's eye viewpoint above the vehicle, which has been generated on the basis of the captured image data items; and a specification section that specifies a candidate region where the vehicle is to be parked in the surrounding region that is present in a side direction of the vehicle, the surrounding region having been imaged as the captured image data items, wherein the display control section displays second bird's-eye view image data with a wider display range in the side direction in which the candidate region is present as compared with the first bird's-eye view image data.

6 Claims, 16 Drawing Sheets

(56) References Cited

U.S. PATENT DOCUMENTS

| | | | |
|---|---|---|---|
| 2014/0152774 A1* | 6/2014 | Wakabayashi | G06T 3/005 348/46 |
| 2015/0130640 A1* | 5/2015 | Ryu | G06K 9/00812 340/932.2 |
| 2017/0188201 A1* | 6/2017 | Cansino | G08G 1/09626 |
| 2018/0308358 A1* | 10/2018 | Hayakawa | B62D 15/02 |

* cited by examiner

FIG.10
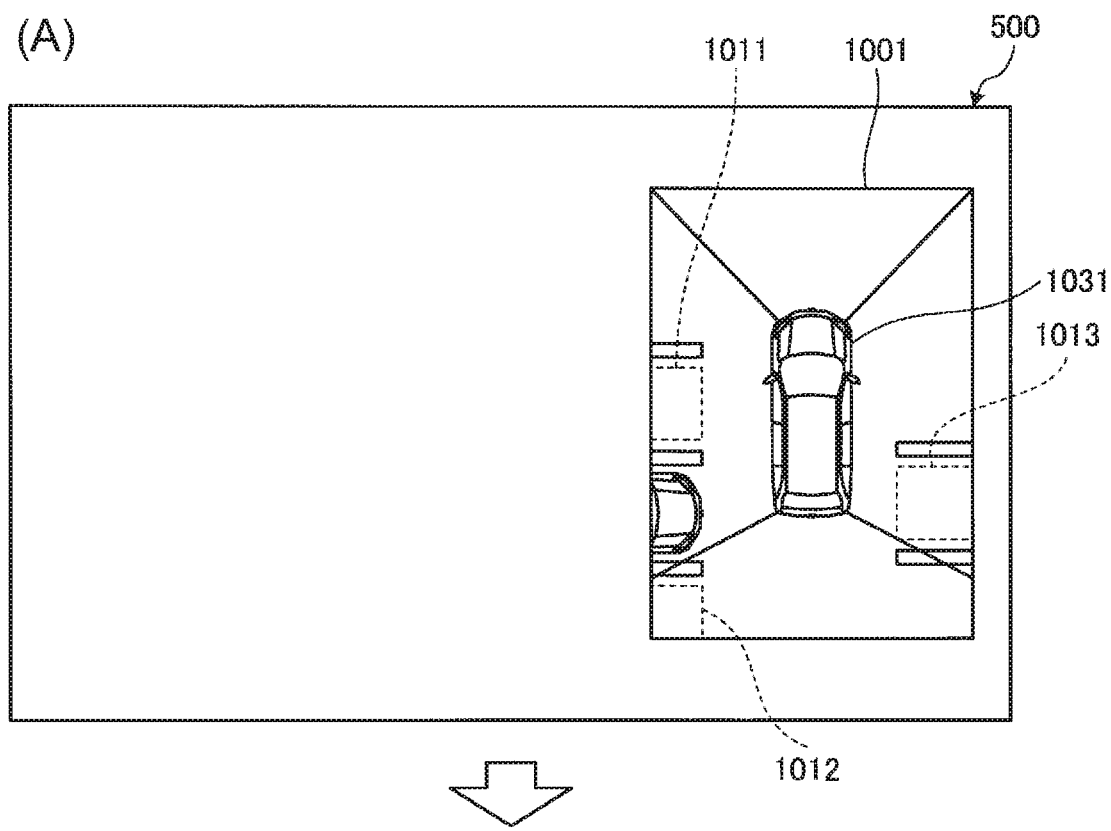
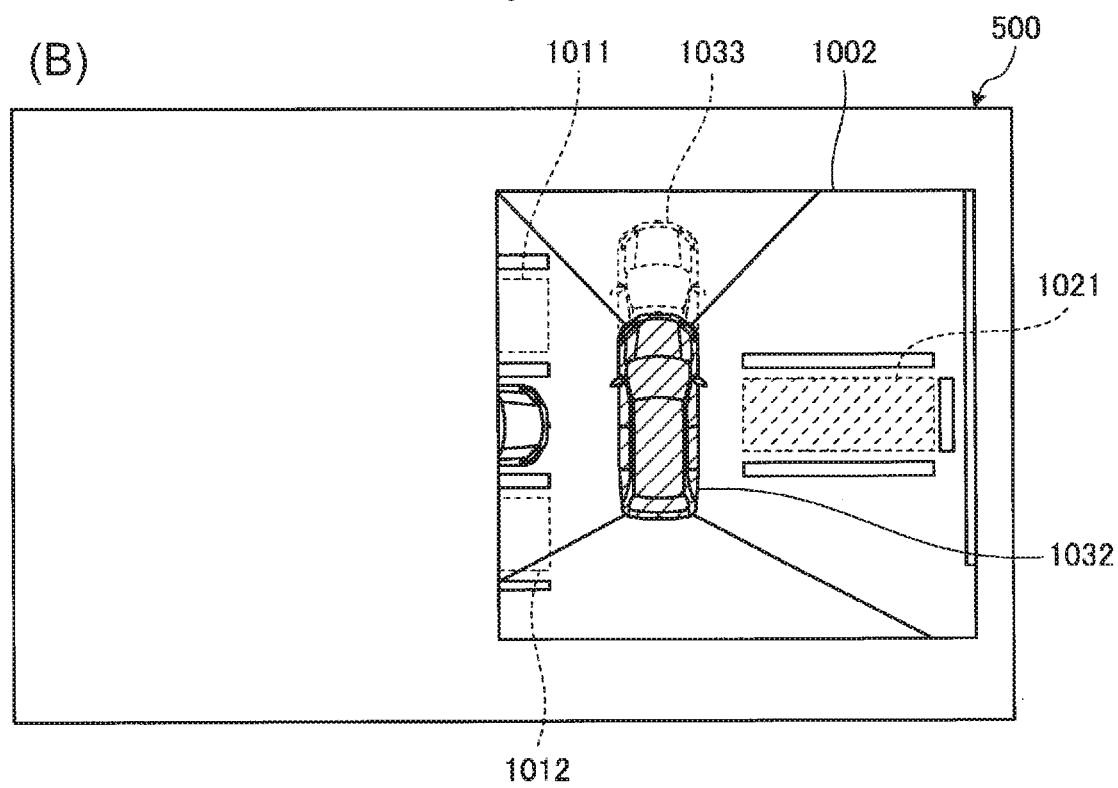

DISPLAY CONTROL DEVICE

CROSS REFERENCE TO RELATED APPLICATIONS

This application is based on and claims priority under 35 U.S.C. § 119 to Japanese Patent Application 2017-139756, filed on Jul. 19, 2017, the entire contents of which are incorporated herein by reference.

TECHNICAL FIELD

Embodiments of this disclosure relate to a display control device.

BACKGROUND DISCUSSION

In the related art, there is a technology of imaging surroundings of a vehicle by a plurality of imaging sections provided in the surroundings of the vehicle, synthesizing a plurality of captured image data items as bird's-eye view image data with reference to the vehicle, and displaying synthesized bird's-eye view image data, thereby allowing a driver to recognize the surroundings of the vehicle. Further, there is a technology of changing a display region of bird's-eye view image data to be displayed in accordance with a traveling direction of a vehicle. JP 2015-76645A (Reference 1) is an example of the related art.

However, the technologies in the related art are merely adapted such that the display region of the bird's-eye view image data to be displayed is changed in accordance with the traveling direction of the vehicle and do not take how a condition of a region as a candidate of parking is when the vehicle is parked into consideration.

Thus, a need exists for a display control device which is not susceptible to the drawback mentioned above.

SUMMARY

A display control device according to an aspect of this disclosure includes, as an example: an acquisition section that acquires a plurality of captured image data items from a plurality of imaging sections that image a surrounding region of a vehicle; a display control section that displays first bird's-eye view image data representing surroundings of the vehicle from a bird's eye viewpoint above the vehicle, which has been generated on the basis of the plurality of captured image data items acquired by the acquisition section; and a specification section that specifies a candidate region where the vehicle is to be parked in the surrounding region that is present in a side direction of the vehicle, the surrounding region having been imaged as the captured image data items, in which the display control section displays second bird's-eye view image data with a wider display range in the side direction of the vehicle in which the candidate region specified by the specification section is present as compared with the first bird's-eye view image data.

A display control device according to another aspect of this disclosure includes: an acquisition section that acquires a plurality of captured image data items from a plurality of imaging sections that image a surrounding region of a vehicle; a display control section that displays bird's-eye view image data representing an external environment from a bird's eye viewpoint above the vehicle, which has been generated on the basis of the plurality of captured image data items acquired by the acquisition section; and a specification section that specifies a candidate region where the vehicle is to be parked in the surrounding region that is present in a side direction of the vehicle, the surrounding region been represented in the bird's-eye view image data, in which the display control section further displays the captured image data items that include the candidate region specified by the specification section.

BRIEF DESCRIPTION OF THE DRAWINGS

The foregoing and additional features and characteristics of this disclosure will become more apparent from the following detailed description considered with the reference to the accompanying drawings, wherein:

FIG. 10 shows diagrams illustrating, as an example, transition of a display screen that is displayed by a display control section according to the second embodiment;

DETAILED DESCRIPTION

Figure 1:
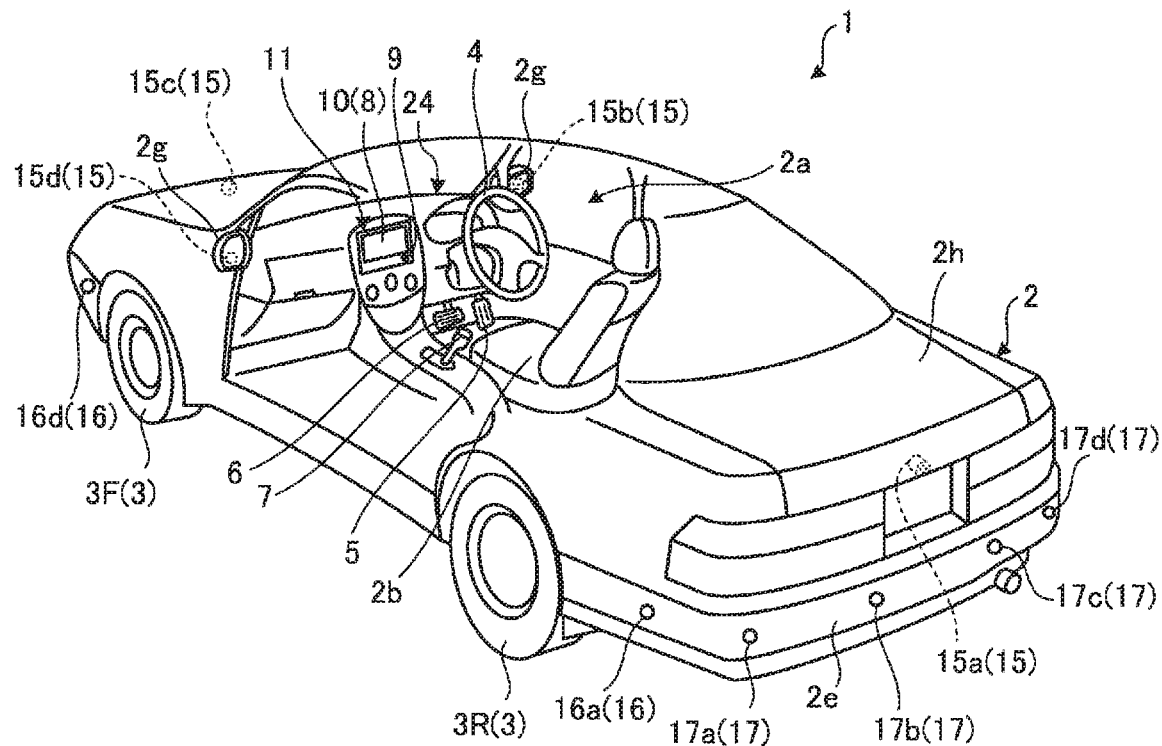
FIG. 1 is a perspective view illustrating an example of a state of a part of a vehicle interior in a vehicle, on which a display control device according to a first embodiment is mounted, in a see-through manner.

Hereinafter, exemplary embodiments will be disclosed. Configurations of the embodiments, and actions, results, and advantages that are achieved by the configurations, which will be described below, are examples. The embodiments disclosed here can be realized by configuration other than those disclosed in the following embodiments, and at least one of various advantages based on basic configurations and derivative advantages can be obtained.

First Embodiment

A vehicle 1 according to a first embodiment may be an automobile that uses an internal combustion engine, which is not illustrated in the drawings, as a drive source, that is, an internal combustion engine automobile, an automobile that uses an electric motor, which is not illustrated in the drawings, as a drive source, that is, an electric automobile, a fuel cell automobile, or the like, a hybrid automobile that uses both as drive sources, or an automobile provided with another drive source. Various transmission devices can be mounted on the vehicle 1, and various devices necessary for driving the internal combustion engine or the electric motor, for example, a system, a part, and the like can be mounted thereon. Also, schemes, the number, layout, and the like of devices related to driving of wheels 3 in the vehicle 1 can be set in various manners.

As illustrated in FIG. 1 as an example, a vehicle body 2 forms a vehicle interior 2a in which passengers who are not illustrated in the drawing ride. A steering section 4, an acceleration operation section 5, a brake operation section 6, a transmission operation section 7, and the like are provided inside the vehicle interior 2a in a state in which the steering section 4, the acceleration operation section 5, the brake operation section 6, the transmission operation section 7, and the like face a seat 2b for a driver as a passenger. The steering section 4 is a steering wheel that protrudes from a dashboard 24, for example. The acceleration operation section 5 is an acceleration pedal that is positioned near the feet of the driver, for example. The brake operation section 6 is a brake pedal positioned near the feet of the driver, for example. The transmission operation section 7 is a shift lever that protrudes from a center console, for example. Note that, the steering section 4, the acceleration operation section 5, the brake operation section 6, the transmission operation section 7, and the like are not limited thereto.

A display device 8 that serves as a display output section and a sound output device 9 that serves as a sound output section are provided inside the vehicle interior 2a. The display device 8 is a liquid crystal display (LCD) or an organic electroluminescent display (OELD), for example. The sound output device 9 is a speaker, for example. The display device 8 is covered with a transparent operation input section 10, such as a touch panel, for example. The passengers can visually recognize an image displayed on a display screen of the display device 8 via the operation input section 10. The passengers can execute operation inputs by operating the operation input section 10 by touching, pressing, or moving the operation input section 10 with hand fingers at a position corresponding to the image displayed on the display screen of the display device 8. The display device 8, the sound output device 9, the operation input section 10, and the like are provided in a monitor device 11 at the center in a vehicle width direction, that is, a left-right direction of the dashboard 24, for example. The monitor device 11 can have an operation section, such as a switch, a dial, a joystick, or a press button, which is not illustrated in the drawing. The sound output device, which is not illustrated in the drawing, may be provided at another position, which is different from that of the monitor device 11, inside the vehicle interior 2a, and it is possible to output sound from the sound output device 9 in the monitor device 11 and another sound output device. Note that the monitor device 11 can also serve as a navigation system and an audio system, for example.

Figure 2:
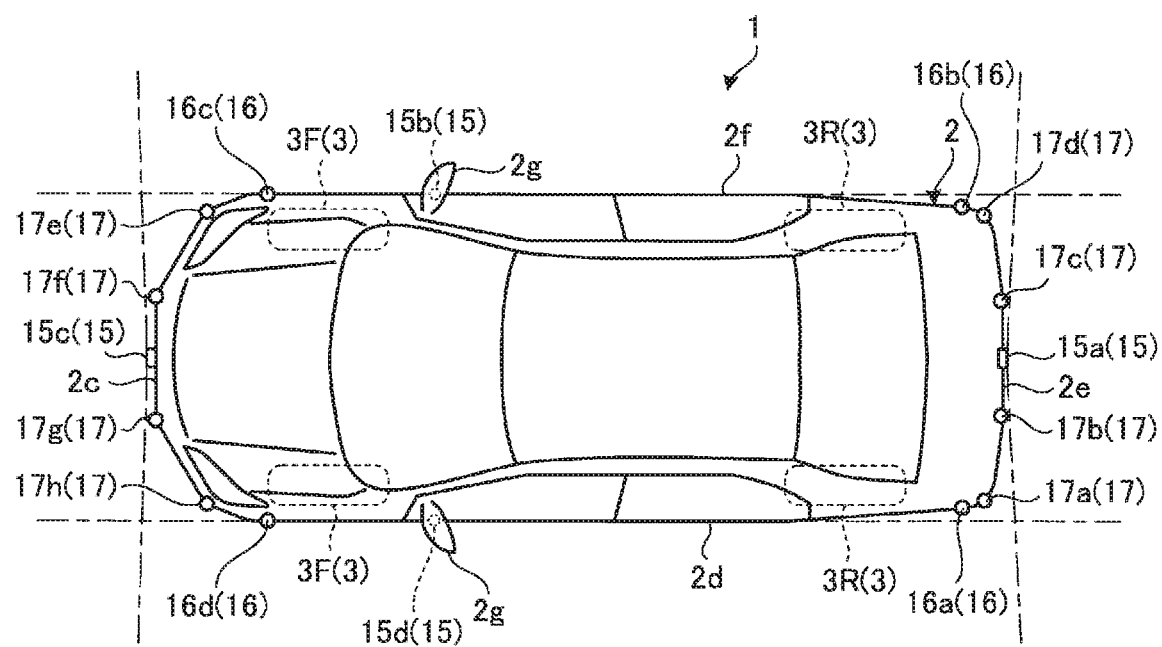
FIG. 2 is a plan view (bird's-eye view) illustrating the example of the vehicle, on which the display control device according to the first embodiment is mounted.
Figure 3:
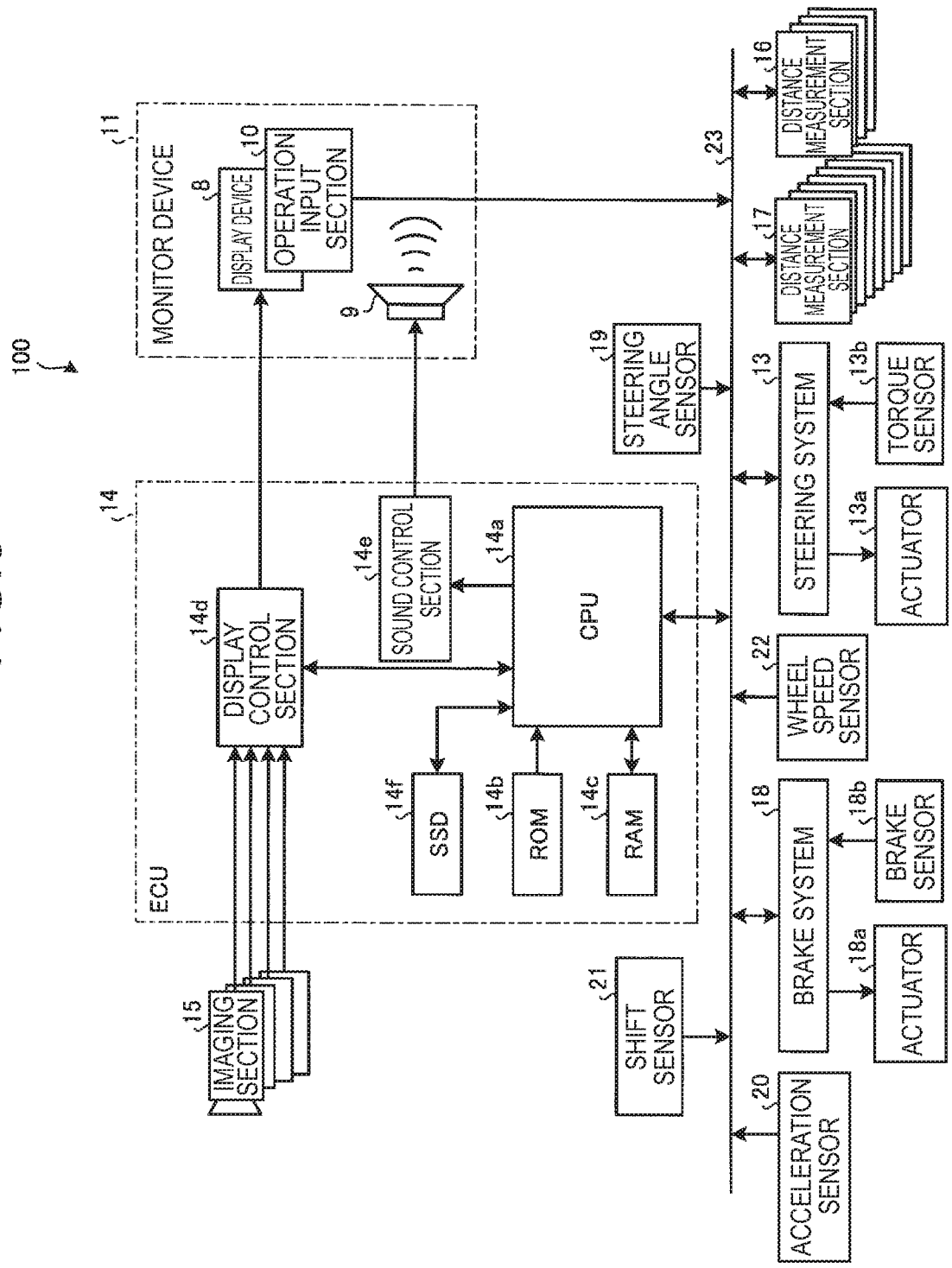
FIG. 3 is a block diagram illustrating an example of a configuration of a display control system that has the display control device according to the first embodiment.

As illustrated in FIGS. 1 and 2 as an example, the vehicle 1 is a four-wheel automobile, for example, and has two left and right front wheels 3F and two left and right rear wheels 3R. All these four wheels 3 can be configured so as to be able to be turned. As illustrated in FIG. 3 as an example, the vehicle 1 has a steering system 13 for steering at least two wheels 3. The steering system 13 has an actuator 13a and a torque sensor 13b. The steering system 13 is electrically controlled by an electronic control unit (ECU) 14 or the like and causes the actuator 13a to operate. The steering system 13 is an electric power steering system or a steer by wire (SBW) system, for example. The steering system 13 supplements steering force by applying a torque, that is, assisting torque to the steering section 4 by the actuator 13a or turns the wheels 3 by the actuator 13a. In this case, the actuator 13a may turn one wheel 3 or may turn a plurality of wheels 3. The torque sensor 13b detects the torque that the driver applies to the steering section 4, for example.

As illustrated in FIG. 2 as an example, four imaging sections 15a to 15d, for example, are provided as a plurality of imaging sections 15 in the vehicle body 2. The imaging sections 15 are digital cameras with imaging elements, such as charge coupled devices (CCDs) or CMOS image sensors (CISs), for example, incorporated therein. The imaging sections 15 can output movie data at a predetermined frame rate. Each of the imaging sections 15 has a wide-angle lens or a fisheye lens and can capture images in a range of 140° to 190°, for example, in the horizontal direction. Optical axes of the imaging sections 15 are set toward an obliquely downward side. Therefore, the imaging sections 15 successively image an external environment in the surroundings of the vehicle body 2 including a road surface on which the vehicle 1 can move and a region where the vehicle 1 can be parked and output the images as captured image data items.

The imaging section 15a is positioned at an end portion 2e on the rear side of the vehicle body 2, for example, and is provided at a wall portion below a door 2h of a rear trunk. The imaging section 15b is positioned on the right side of the vehicle body 2, that is, at an end portion 2f on the right side in the vehicle width direction, for example, and is provided at a door mirror 2g that is a protruding portion on the right side. The imaging section 15c is positioned on the front side of the vehicle body 2, that is, at an end portion 2c on the front side in the front-back direction of the vehicle, for example, and is provided at a front bumper or the like. The imaging section 15d is positioned on the left side of the vehicle body 2, that is, at an end portion 2d on the left side in the vehicle width direction and is provided at a door mirror 2g that is a protruding portion on the left side. The ECU 14 can execute arithmetic processing and image processing on the basis of the image data obtained by the plurality of imaging sections 15, generate images at wider view angles, and generate a virtual bird's-eye view image of the vehicle 1 viewed from the upper side. Note that the bird's-eye view image can also be referred to as a planar image.

The ECU 14 identifies division lines and the like represented on the road surface in the surroundings of the vehicle 1 and detects (extracts) a parking section represented by the division lines from the images obtained by the imaging sections 15.

As illustrated in FIGS. 1 and 2 as an example, four distance measurement sections 16a to 16d and eight distance measurement sections 17a to 17h, for example, are provided as a plurality of distance measurement sections 16 and 17 in the vehicle body 2. The distance measurement sections 16 and 17 are sonars that emit ultrasonic waves and catch reflected waves thereof, for example. The sonars can also be referred to as sonar sensors or ultrasonic detectors. The ECU 14 can measure presence of an object, such as an obstacle, that is present in the surroundings of the vehicle 1 and the distance to the object on the basis of detection results obtained by the distance measurement sections 16 and 17. That is, the distance measurement sections 16 and 17 are examples of detection sections that detect an object. Note that the distance measurement section 17 can be used to detect an object at a relatively short distance, for example. The distance measurement section 16 can be used to detect an object at a relatively long distance as compared with the distance measurement section 17, for example. The distance measurement section 17 can be used to detect an object on the front and back sides of the vehicle 1, for example. The distance measurement section 16 can be used to detect an object in the side direction of the vehicle 1. The distance measurement sections 16 and 17 may be radar devices or the like.

As illustrated in FIG. 3 as an example, a brake system 18, a steering angle sensor 19, an acceleration sensor 20, a shift sensor 21, a wheel speed sensor 22, and the like in addition to the ECU 14, the monitor device 11, the steering system 13, the distance measurement sections 16 and 17 are electrically connected via an in-vehicle network 23 as an electric communication line in the parking assistant system 100. The in-vehicle network 23 is configured as a controller area network (CAN), for example. The ECU 14 can control the steering system 13, the brake system 18, and the like by sending control signals through the in-vehicle network 23. The ECU 14 can receive results of detection performed by the torque sensor 13b, the brake sensor 18b, the steering angle sensor 19, the distance measurement sections 16, the distance measurement sections 17, acceleration sensor 20, the shift sensor 21, the wheel speed sensor 22, and the like, operation signals of the operation input section 10, and the like via the in-vehicle network 23.

The ECU 14 has a central processing unit (CPU) 14a, a read only memory (ROM) 14b, a random access memory (RAM) 14c, a display control section 14d, a sound control section 14e, and a solid-state drive (SSD, flash memory) 14f, for example. The CPU 14a can execute various kinds of arithmetic processing and control such as image processing related to an image displayed on the display device 8, decision of a target position of the vehicle 1, an arithmetic operation of a traveling route of the vehicle 1, determination of presence of interference with an object, automatic control of the vehicle 1, and release of automatic control. The CPU 14a can read programs that have been installed and stored in non-volatile storage devices such as the ROM 14b and execute arithmetic processing in accordance with the programs. The RAM 14c temporarily stores various data items used for arithmetic operations performed by the CPU 14a. The display control section 14d mainly executes image processing using image data obtained by the imaging sections 15, synthesis of image data displayed on the display device 8, and the like in the arithmetic processing performed by the ECU 14. The sound control section 14e mainly executes processing of sound data output by the sound output device 9 in the arithmetic processing performed by the ECU 14. The SSD 14f is a rewritable non-volatile storage section and can store data even in a case in which a power source of the ECU 14 is turned off. Note that the CPU 14a, the ROM 14b, the RAM 14c, and the like can be integrated within the same package. The ECU 14 may have a configuration in which another logical arithmetic processor, a logic circuit, or the like, such as a digital signal processor (DSP), is used instead of the CPU 14a. A hard disk drive (HDD) may be provided instead of the SSD 14f, and the SSD 14f and the HDD may be provided separately from the ECU 14. The ECU 14 is an example of the display control device.

The brake system 18 is an anti-lock brake system (ABS) that suppresses locking of the brake, a lateral slipping prevention device (electronic stability control; ESC) that suppresses lateral slipping of the vehicle 1 at the time of cornering, an electric brake system that increases brake force (executes brake assistance), or a brake by wire (BBW), for example. The brake system 18 applies brake force to the wheels 3 and thus to the vehicle 1 via the actuator 18a. The brake system 18 can detect locking of the brake, spinning of the wheels 3, a sign of lateral slipping, or the like from a rotational difference between left and right wheels 3 or the like and execute various kinds of control. The brake sensor 18b is a sensor that detects the position of a movable portion of the brake operation section 6, for example. The brake sensor 18b can detect the position of the brake pedal as the movable portion. The brake sensor 18b includes a displacement sensor.

The steering angle sensor 19 is a sensor that detects the amount of steering performed by the steering section 4, such as a steering wheel, for example. The steering angle sensor 19 is configured by a hall element, for example. The ECU 14 acquires the amount of steering performed by the driver on the steering section 4, the amount of steering of the respective wheels 3 at the time of automatic steering, and the like from the steering angle sensor 19 and executes various kinds of control. Note that the steering angle sensor 19 detects a rotation angle of a rotation portion included in the steering section 4. The steering angle sensor 19 is an example of an angle sensor.

The acceleration sensor 20 is a sensor that detects the position of the movable portion of the acceleration operation section 5, for example. The acceleration sensor 20 can detect the position of the acceleration pedal as the movable portion. The acceleration sensor 20 includes a displacement sensor.

The shift sensor 21 is a sensor that detects the position of the movable portion of the transmission operation section 7, for example. The shift sensor 21 can detect the positions of the lever, the arm, the button, and the like as movable portions. The shift sensor 21 may include a displacement sensor or may be configured as a switch.

The wheel speed sensor 22 is a sensor that detects the amount of rotation of the wheels 3 and the rotation rate per unit time. The wheel speed sensor 22 outputs a wheel speed pulse value indicating the detected rotation rate as a sensor value. The wheel speed sensor 22 can be configured by a hall element, for example. The ECU 14 computes the amount of movement of the vehicle 1 or the like on the basis of the sensor value acquired from the wheel speed sensor 22 and executes various kinds of control. Note that there is also a case in which the wheel speed sensor 22 is provided at a brake system 18. In that case, the ECU 14 acquires the detection result of the wheel speed sensor 22 via the brake system 18.

Note that the configurations, the arrangement, the electrical connection forms, and the like of the various sensors and the actuators described above are examples and can be set (changed) in various manners.

Figure 4:
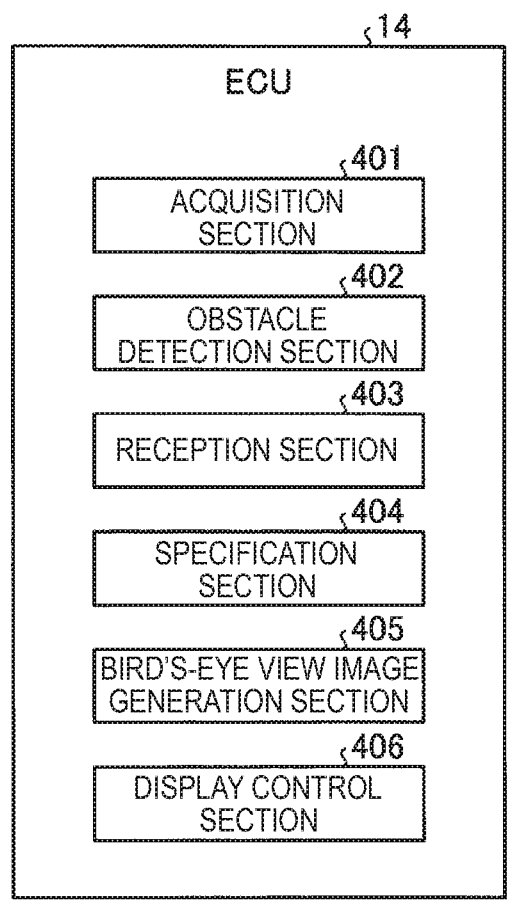
FIG. 4 is a diagram illustrating, as an example, a software configuration that is realized by an ECU that serves as the display control device according to the first embodiment.

As illustrated in FIG. 4, the ECU 14 includes an acquisition section 401, an obstacle detection section 402, a reception section 403, a specification section 404, a bird's-eye view image generation section 405, a display control section 406, and the like. The CPU 14a functions as the acquisition section 401, the obstacle detection section 402, the reception section 403, the specification section 404, the bird's-eye view image generation section 405, the display control section 406, and the like by executing processing in accordance with programs. Data used for arithmetic processing performed by the respective parts, data of arithmetic processing results, and the like are stored in the storage sections such as the RAM 14c and the ROM 14b. Note that at least a part of the functions of the aforementioned respective parts may be realized by hardware.

The acquisition section 401 acquires a plurality of captured image data items from the plurality of imaging sections 15 that image the surrounding region of the vehicle 1. The acquisition section 401 acquires a result of detecting an object that is present in the surrounding region of the vehicle 1 (hereinafter, also referred to as distance measurement data) from the distance measurement sections 16 and 17. Note that although the example in which the distance measurement sections 16 and 17 are used for detecting the object that is present in the surrounding region of the vehicle 1 as detection sections that detect the object will be described in the embodiment, the detection sections are not limited to the distance measurement sections 16 and 17. The object may be detected by analyzing the captured image data items captured by the imaging sections 15, or the object may be detected by using a laser sensor or the like, for example.

The obstacle detection section 402 detects an obstacle that is present in the surrounding region of the vehicle 1, which has been imaged as the captured image data items, on the basis of the distance measurement data acquired by the acquisition section 401. In another method, the obstacle detection section 402 may detect the obstacle (vehicles that are parking, for example) that are present in the surrounding region of the vehicle 1 by performing image analysis on the captured image data items acquired by the acquisition section 401. Note that the obstacle may be a moving obstacle or may be a stationary obstacle.

The specification section 404 specifies the candidate region where the vehicle 1 is to be parked in the surrounding region that is present in the side direction of the vehicle 1, which has been imaged as the captured image data items. The specification section 404 according to the embodiment extracts parking division lines (for example, while lines) in the captured image data items and specifies a region where an obstacle or other vehicles are determined not to be present by the obstacle detection section 402 as a candidate region where the vehicle 1 is to be parked in a region surrounded by the parking division lines. Note that any method may be used as a method of specifying the candidate region where the vehicle 1 is to be parked regardless of any known methods as long as it is possible to specify the region where the vehicle 1 can be parked.

The bird's-eye view image generation section 405 converts the captured image data items acquired by the acquisition section 401 and generates bird's-eye view image data with reference to a virtual viewpoint. It is considered that a position at a predetermined distance from the vehicle 1 on the upper side is regarded as the virtual viewpoint, for example.

The bird's-eye view image data is image data generated by synthesizing the captured image data items acquired by the acquisition section 401 and is image data on which image processing has been performed by the bird's-eye view image generation section 405 such that the image data becomes display image data with reference to the virtual viewpoint. The bird's-eye view image data is image data representing the surroundings of the vehicle 1 from a bird's eye viewpoint with reference to the vehicle 1 after arranging an icon (display data) indicating the vehicle 1 at the center.

The display control section 406 displays the bird's-eye view image data generated by the bird's-eye view image generation section 405 on the display device 8. The display control section 406 displays display data indicating the candidate region that has been specified by the specification section 404 on the bird's-eye view image data. In a case in which a plurality of candidate regions specified by the specification section 404 are present, the display control section 406 displays display data indicating that the specified plurality of respective candidate regions are the candidate regions.

Figure 5:
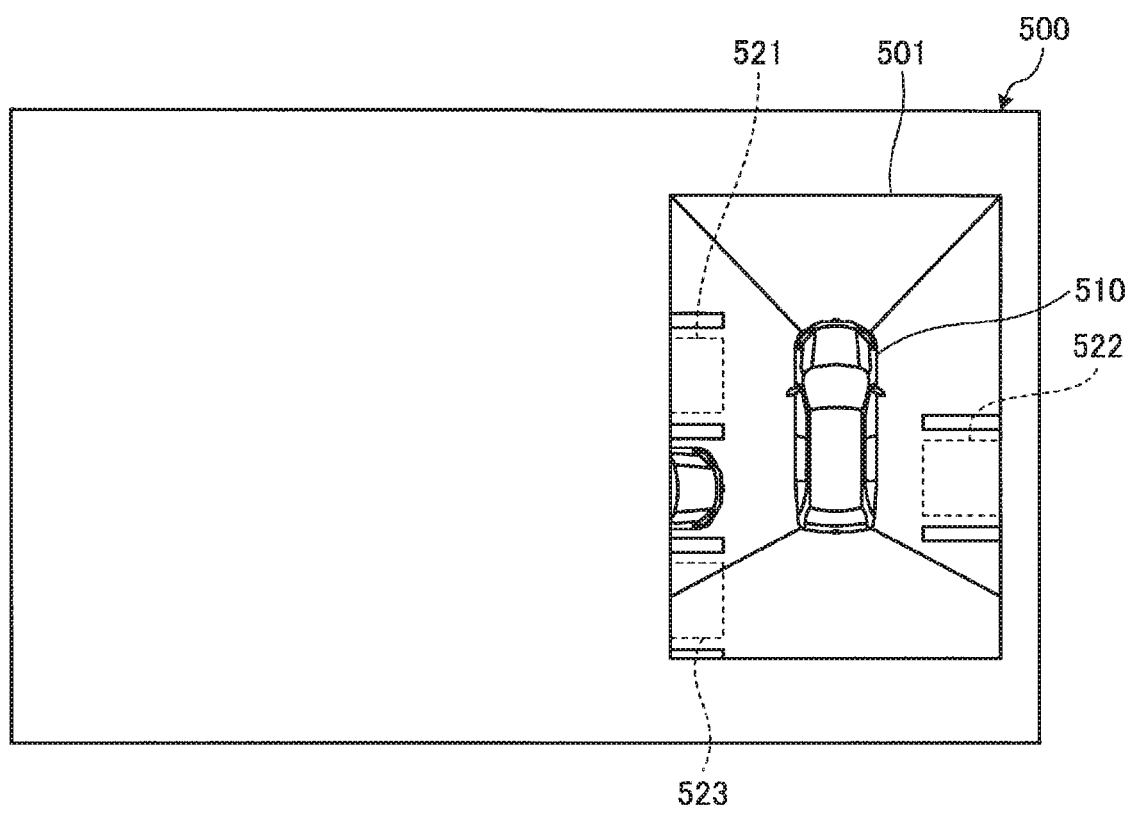
FIG. 5 is a diagram illustrating, as an example, a display screen that is displayed by a display control section according to the first embodiment.

FIG. 5 is a diagram illustrating, as an example, a display screen that is displayed by the display control section 406 according to the first embodiment. In the example illustrated in FIG. 5, a bird's-eye view image data 501 is displayed in a display region 500 of the display device 8. The bird's-eye view image data 501 represents the surroundings of the vehicle 1 with reference to an icon 510 indicating the vehicle 1. Further, the bird's-eye view image data 501 indicates a case in which a plurality of candidate regions have been specified by the specification section 404, and display data indicating a plurality of candidate regions 521 to 523, which are present in the side direction of the vehicle 1, in which the vehicle 1 can be parked is displayed therein. The example illustrated in FIG. 5 is assumed to be an example in which the rectangles of the dotted lines are represented as the display data indicating the candidate regions 521 to 523.

It is difficult to ascertain how conditions behind the candidate regions 521 to 523 are from the bird's-eye view image data 501 as illustrated in FIG. 5. Thus, the ECU 14 according to the embodiment performs control such that an entire candidate region, the selection of which has been received, is displayed in a case in which selection of any one of the candidate regions 521 to 523 has been received in a state in which the candidate regions 521 to 523 can be selected.

In a case in which the plurality of candidate regions have been specified by the specification section 404, the reception section 403 receives selection of a candidate region as a target of display from among the plurality of candidate regions. In the example of the bird's-eye view image data 501 illustrated in FIG. 5, the reception section 403 receives selection of any one of the candidate regions 521 to 523 from the driver via the operation input section 10 that is a touch panel or the like. In the embodiment, a method of receiving the selection of the candidate region is not limited to a touch operation performed on the candidate regions 521 to 523 via the operation input section 10 and may be a selection operation using the steering section 4.

In a case in which the reception section 403 has received the selection of the candidate region, the bird's-eye view image generation section 405 generate bird's-eye view image data with a wider display range in the side direction of the vehicle 1 in which the candidate region, the selection of which has been received by the reception section 403, is present as compared with the bird's-eye image data that has already been displayed.

The example in which selection from among the plurality of candidate regions is received in the case in which the plurality of candidate regions specified by the specification section 404 are present has been described in the embodiment. However, the embodiment is not limited to the method of switching image data to such bird's-eye view image data that includes the entire candidate region, the selection of which has been received, in a case in which selection from among the plurality of candidate regions has been received. In a case in which only one candidate region specified by the specification section 404 is present, for example, the bird's-eye view image generation section 405 may generate such bird's-eye view image data with a wide display range in the side direction of the vehicle that includes the entire one candidate region at a timing at which the reception section 403 receives an operation of switching the display or the like.

Then, the display control section 406 displays the bird's-eye view image data newly generated by the bird's-eye view image generation section 405.

Figure 6:
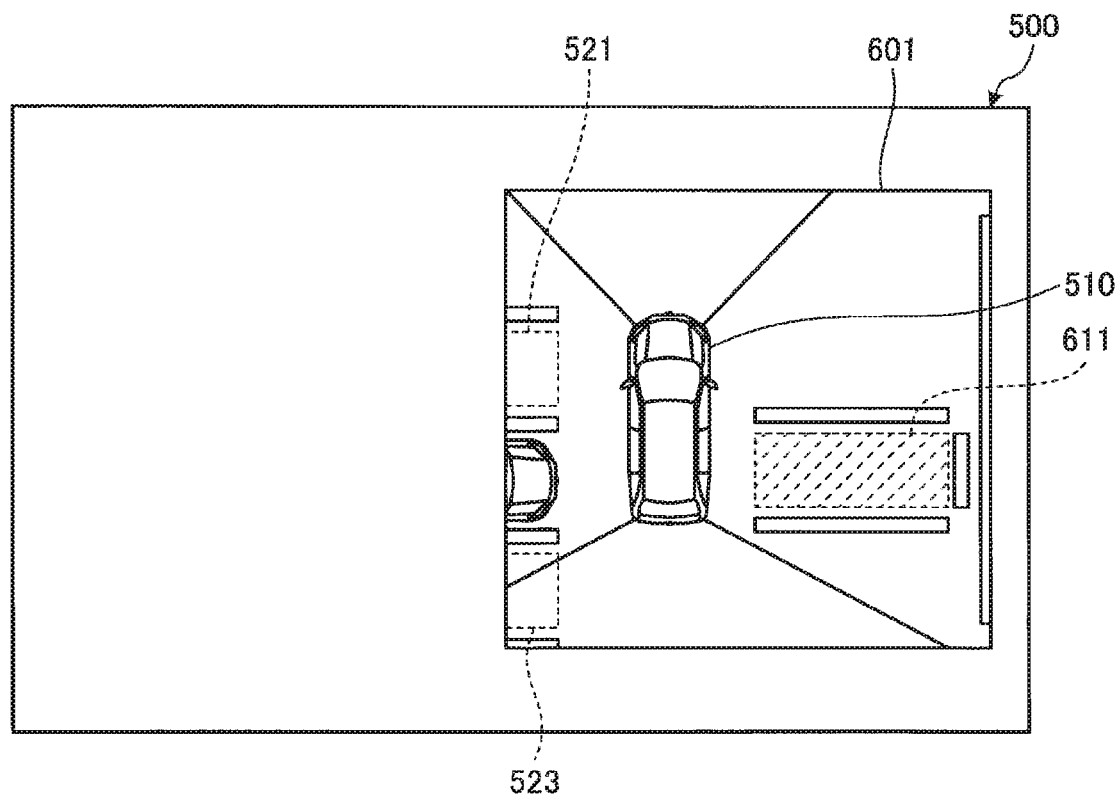
FIG. 6 is a diagram illustrating, as an example, a display screen that is displayed by the display control section according to the first embodiment.

FIG. 6 is a diagram illustrating, as an example, a display screen that is displayed by the display control section 406. In the example illustrated in FIG. 6, a bird's-eye view image data 601 is displayed in the display region 500 of the display device 8. The bird's-eye view image data 601 represents the surroundings of the vehicle 1 with reference to the icon 510 indicating the vehicle 1. The bird's-eye view image data 601 is bird's-eye view image data displayed in a case in which selection of the candidate region 522 illustrated in FIG. 5 has been received. Therefore, the display range has been enlarged such that the entire candidate regions 611 are displayed. The candidate region 611 is displayed with hatching in order to represent that the selection thereof has been received.

Although the example of the bird's-eye view image data 601 with an enlarged display range in the right side direction of the vehicle 1 as compared with the bird's-eye view image data 501 illustrated in FIG. 5 is illustrated in FIG. 6, the embodiment is not limited to such a display form. For example, the entire candidate region, the selection of which has been received, may be displayed by increasing a contraction ratio of the display region as compared with the bird's-eye view image data 501 and then causing the range to be displayed including the icon 510 indicating the vehicle 1 to deviate in the left-right direction. In other words, any display form may be employed as long as the display range in the side direction of the vehicle 1 in which the candidate region, the selection of which has been received by the reception section 403, is present becomes wider.

Further, in a case in which the obstacle detected by the obstacle detection section 402 is included in the candidate region, the display control section 406 displays a mark indicating that the vehicle 1 cannot enter the candidate region where the obstacle has been detected.

Figure 7:
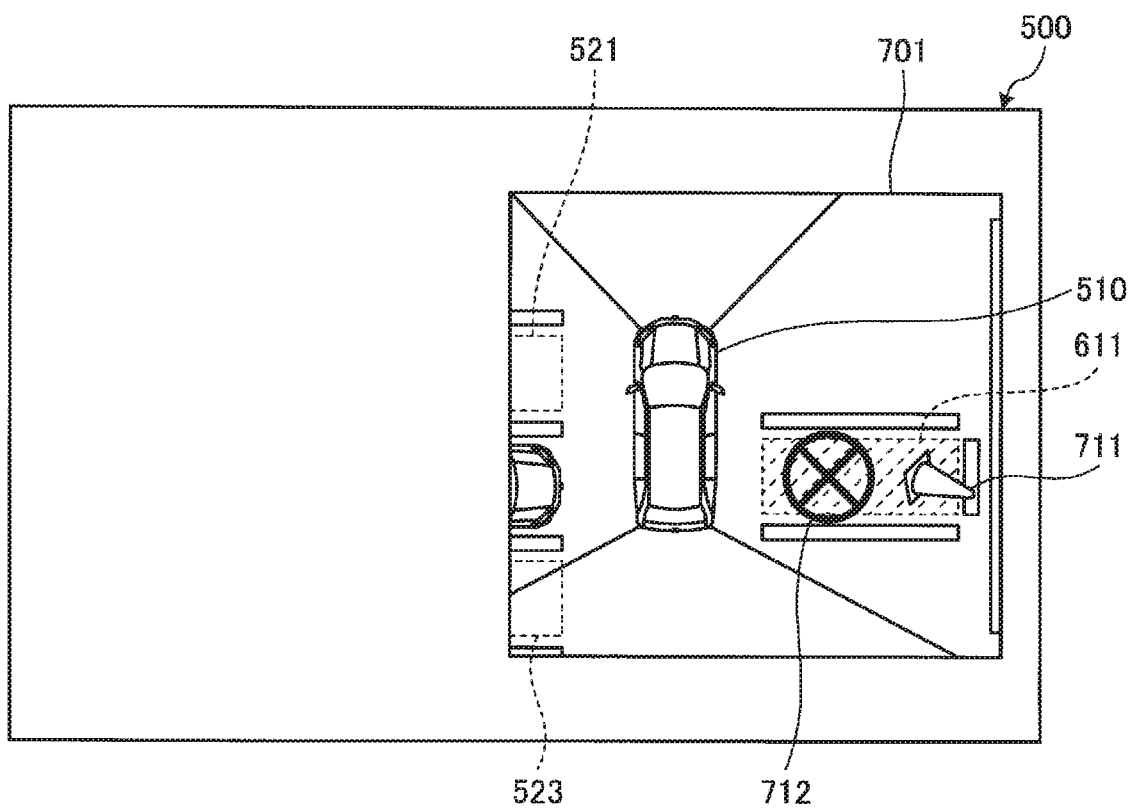
FIG. 7 is a diagram illustrating, as an example, a display screen displayed by the display control section according to the first embodiment.

FIG. 7 is a diagram illustrating, as an example, a display screen that is displayed by the display control section 406. In the example illustrated in FIG. 7, a bird's-eye view image data 701 is displayed in the display region 500 of the display device 8. A mark 712 indicating that the vehicle 1 cannot enter the candidate region 611 is represented in the bird's-eye view image data 701 since an obstacle 711 has been detected in the candidate region 611 by the obstacle detection section 402.

Figure 8:
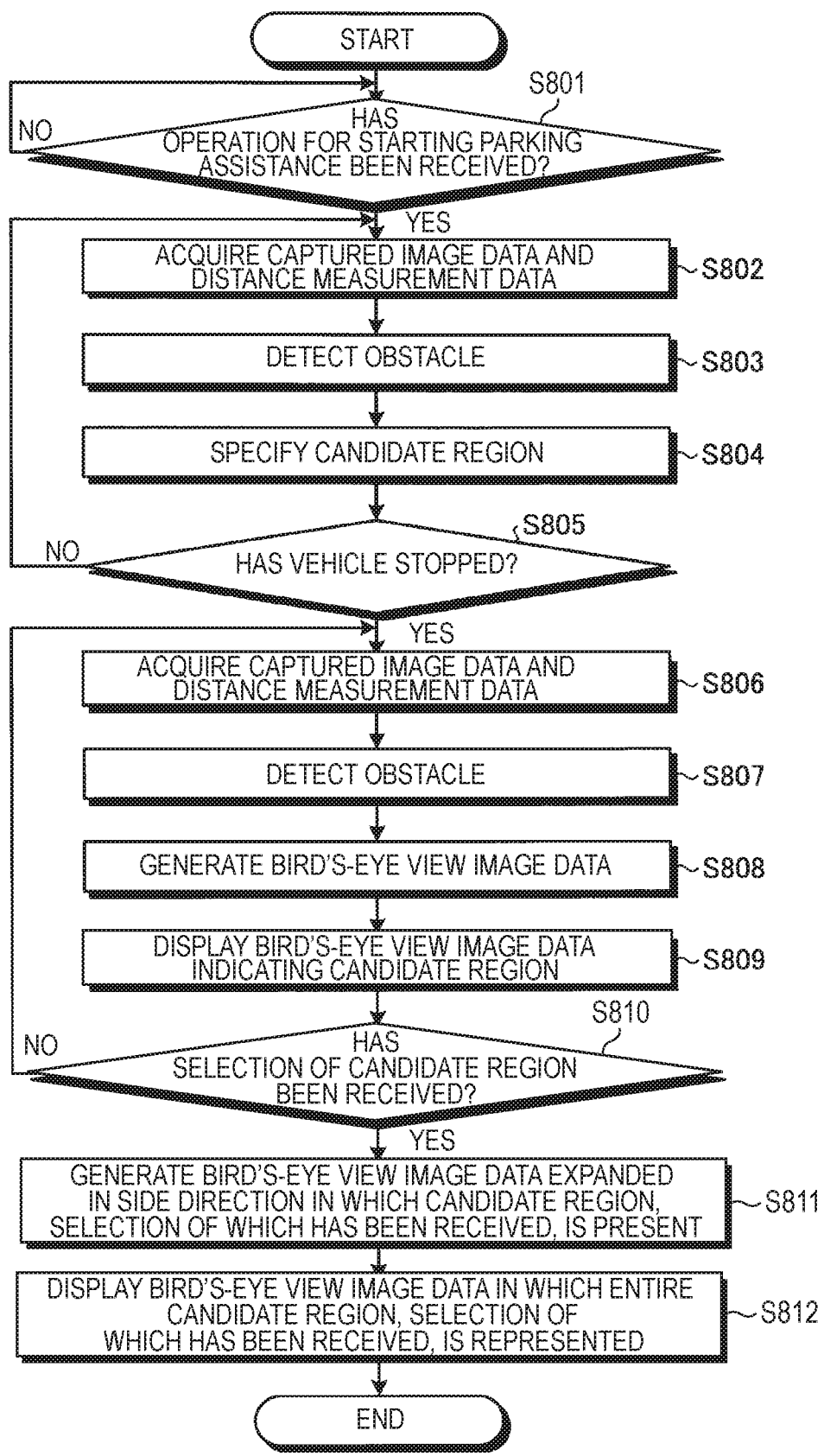
FIG. 8 is a flowchart illustrating a procedure for display processing during parking assistant performed by the ECU according to the first embodiment.

Next, display processing performed by the ECU 14 during parking assistant according to the embodiment is described. FIG. 8 is a flowchart illustrating a procedure for the aforementioned processing performed by the ECU 14 according to the embodiment. Note that it is assumed that the vehicle 1 is running through an isle in a parking at a low speed.

First, the reception section 403 determines whether or not an operation for starting the parking assistant has been received from the operation input section 10 (S801). In a case in which it is determined that the operation for starting the parking assistant has not been received (S801: No), processing in S801 is repeated again.

Meanwhile, in a case in which it is determined that the reception section 403 has received the operation for starting the parking assistant (S801: Yes), the acquisition section 401 acquires captured image data items from the imaging sections 15 and acquires distance measurement data from the distance measurement sections 16 and 17 (S802).

Then, the obstacle detection section 402 detects an obstacle that is present in the surroundings of the vehicle 1 on the basis of the distance measurement data and the captured image data items (S803).

Then, the specification section 404 specifies a region that has been determined to include no obstacle or the like that is present therein by the obstacle detection section 402 as a candidate region where the vehicle 1 can be parked in a region surrounded by parking division lines, which has been recognized from the captured image data items (S804).

Then, the ECU 14 determines whether or not the vehicle 1 has stopped (S805). In a case in which it is determined that the vehicle 1 has not stopped (S805: No), processing in S802 and the following steps is performed again.

Meanwhile, in a case in which the ECU 14 determines that the vehicle 1 has stopped (S805: Yes), the acquisition section 401 acquires the captured image data items from the imaging sections 15 and acquires distance measurement data from the distance measurement sections 16 and 17 (S806). Then, the obstacle detection section 402 detects an obstacle that is present in the surroundings of the vehicle 1 on the basis of the distance measurement data and the captured image data items (S807).

Thereafter, the bird's-eye view image generation section 405 generates bird's-eye view image data on the basis of the captured image data items acquired in S806 (S808).

Then, the display control section 406 displays the bird's-eye view image data indicating the candidate region specified in S804 (S809). In this manner, the driver can ascertain the specified candidate region where the vehicle 1 can be parked during traveling of the vehicle 1. Also, in a case in which an obstacle has been detected in S807 in the candidate region specified in S804, an obstacle is regarded as being present, and the display control section 406 displays a mark indicating that the vehicle 1 cannot enter the candidate region.

Then, it is determined whether or not the reception section 403 has received selection of the candidate region (S810). In a case in which it is determined that the selection has not been received (S810: No), processing in S806 and the following steps is performed again.

Meanwhile it is determined that the reception section 403 has received the selection of the candidate region (S810: Yes), the bird's-eye view image generation section 405 generates bird's-eye view image data expanded in the side direction of the vehicle 1 in which the candidate region, the selection of which has been received, is present (S811).

Then, the display control section 406 displays the bird's-eye view image data generated in S811, in other words, the bird's-eye view image data in which the entire candidate region, the selection of which has been received, is represented (S812).

In the embodiment, the driver can check the condition of the candidate region where the vehicle 1 can be parked by performing the aforementioned processing procedure.

Second Embodiment

In the first embodiment, the example in which the bird's-eye view image data generated from the captured image data items currently captured by the imaging sections 15 is displayed has been described. However, in a case in which a candidate region at a blind angle due to an obstacle or another vehicle is present, there is a possibility that the display control section 406 cannot appropriately display the candidate region on the bird's-eye view image data if the captured image data items currently captured are used. Thus, an example in which bird's-eye view image data in accordance with a candidate region, the selection of which has been received, is displayed by using captured image data items captured in the past will be described in a second embodiment.

In the embodiment, an example in which the bird's-eye view image data generated by using captured image data items captured in the past is displayed in a case in which the candidate region, the selection of which has been received, is in the proximity of the vehicle 1 will be described.

Figure 9:
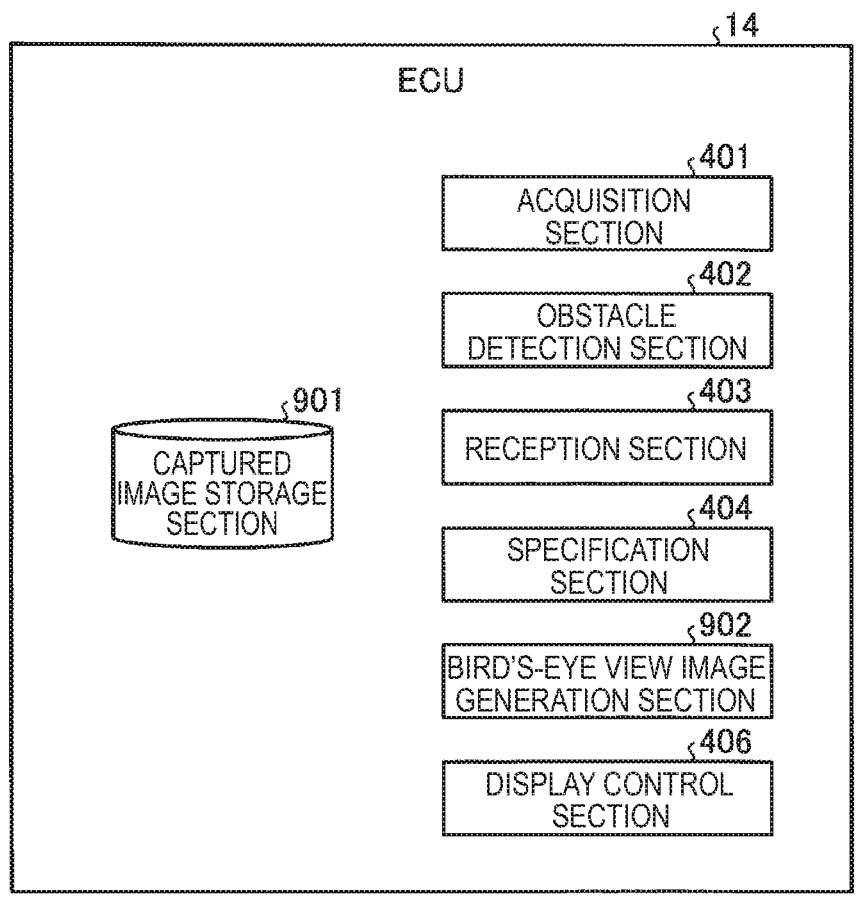
FIG. 9 is a diagram illustrating, as an example, a software configuration that is realized by an ECU according to a second embodiment.

FIG. 9 is a diagram illustrating, as an example, a software configuration that is realized by an ECU 14 according to the second embodiment. As illustrated in FIG. 9, the ECU 14 according to the second embodiment includes a captured image storage section 901 added to the configuration according to the first embodiment, and processing executed with the bird's-eye view image generation section 405 is changed to that executed by a different bird's-eye view image generation section 902.

The captured image storage section 901 stores the captured image data items captured by the acquisition sections 401 in association with position data indicating the positions at which the captured image data have been captured.

The bird's-eye view image generation section 902 converts the captured image data items acquired by the acquisition section 401, generates bird's-eye view image data with reference to the virtual viewpoint, converts the captured image data items stored in the captured image storage section 901, and generates bird's-eye view image data with reference to the virtual viewpoint.

In a case in which the reception section 403 has received the selection of the candidate region, the bird's-eye view image generation section 902 of the embodiment reads captured image data items captured at the closest position to the candidate region from among the captured image data items stored in the captured image storage section 901 and generates bird's-eye view image data based on the captured image data item. The generated bird's-eye image data has a wider display range in the side direction of the vehicle 1 in which the candidate region is present in a manner similar to that in the first embodiment.

FIG. 10 shows diagrams illustrating, as an example, transition of a display screen displayed by the display control section 406. (A) in FIG. 10 illustrates a display screen including bird's-eye view image data 1001 generated by the bird's-eye view image generation section 902 when the vehicle 1 is stopped. Candidate regions 1011 to 1013 are represented in the bird's-eye view image data 1001.

The bird's-eye view image data 1001 is generated on the basis of captured image data items currently captured by the imaging sections 15. In the bird's-eye view image data, the current position of the vehicle 1 is used as a reference. Therefore, there is a possibility that the candidate region specified by the specification section 404 is at a blind angle due to an obstacle or another vehicle when the imaging sections 15 capture images. In this case, there is a possibility that the candidate region cannot appropriately be displayed on the bird's-eye view image data.

Thus, in a case in which the reception section 403 has received the selection of the candidate region, the bird's-eye view image generation section 902 reads the captured image data item captured at the closest position to the candidate region, the selection of which has been received, on the basis of the position data associated with the captured image data items stored in the captured image storage section 901 and generates bird's-eye view image data from the captured image data items in the embodiment.

(B) in FIG. 10 illustrates a display screen including bird's-eye view image data 1002 to be displayed in a case in which the reception section 403 has received the selection of the candidate region 1013. An entire candidate region 1021 corresponding to the candidate region 1013 is represented in the bird's-eye view image data 1002. An icon 1032 indicating the vehicle 1 may be displayed in a display form that is different from that for the icon 1031 so as to indicate the position of the vehicle 1 in the past. An icon 1033 indicating the current position of the vehicle 1 may be displayed in the bird's-eye view image data 1002.

Then, the display control section 406 displays the bird's-eye view image data generated on the basis of the captured image data in the past by the bird's-eye view image generation section 902.

Figure 11:
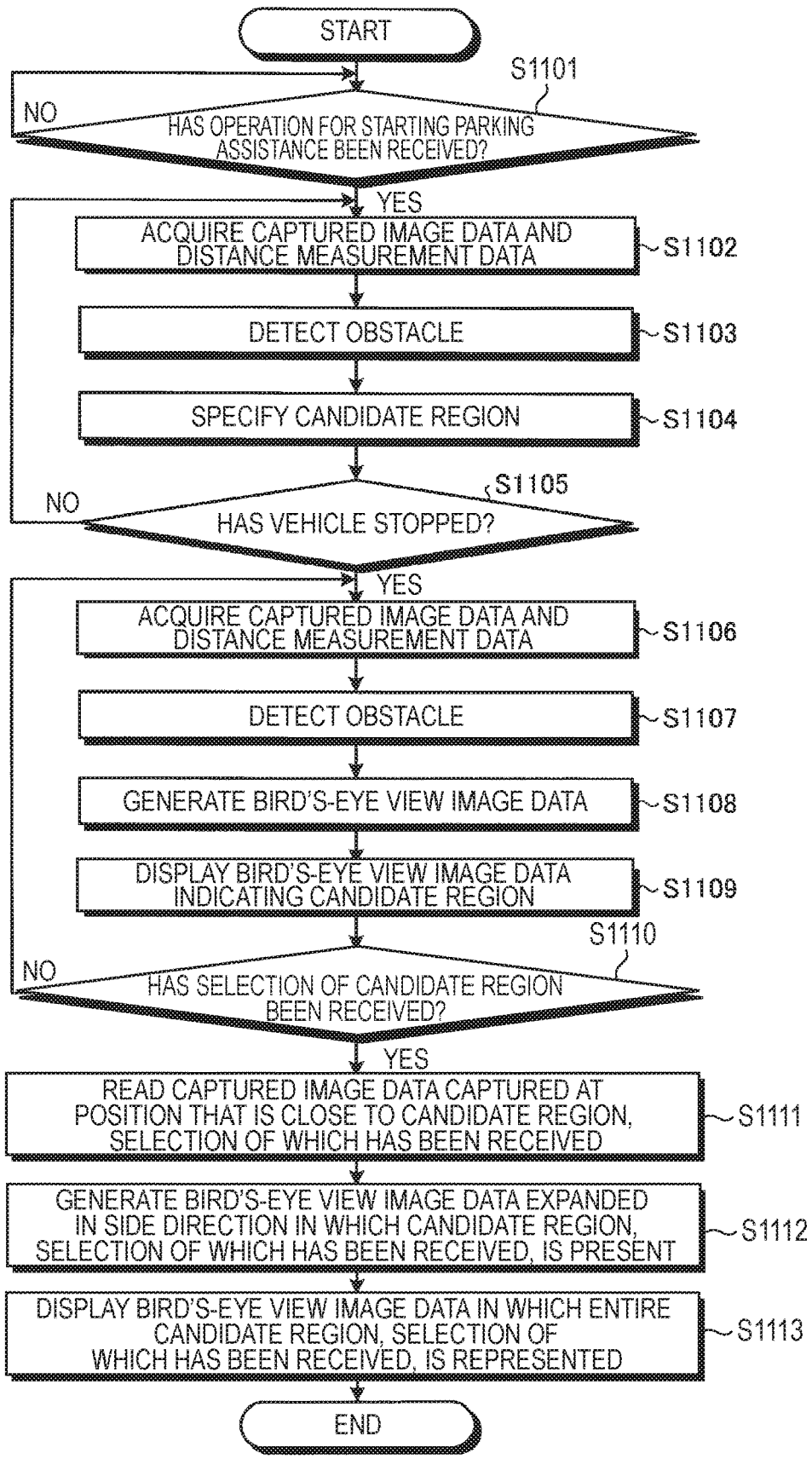
FIG. 11 is a flowchart illustrating a procedure of display processing during parking assistant performed by the ECU according to the second embodiment.

Next, display processing performed by the ECU 14 during the parking assistant will be described. FIG. 11 is a flowchart illustrating a procedure for the aforementioned processing performed by the ECU 14 according to the embodiment.

In the flowchart illustrated in FIG. 11, processing up to reception of a candidate region is performed in a manner similar to that in S801 to S810 in the flowchart illustrated in FIG. 8 (S1101 to S1110).

In a case in which it is determined that the reception section 403 has received the selection of the candidate region in S1110 (S1110: Yes), the bird's-eye view image generation section 902 reads captured image data item captured at a close position to the candidate region, the selection of which has been received, from the captured image storage section 901 (S1111).

Then, the bird's-eye view image generation section 902 generates bird's-eye view image data that is expanded in the side direction of the vehicle 1 in which the candidate region, the selection of which has been received, is present by using the read captured image data items (S1112).

Then, the display control section 406 displays the bird's-eye view image data generated in S1112, in other words, the bird's-eye view image data in which the entire candidate region, the selection of which has been received, is represented (S1113).

In the embodiment, it is possible to check the condition in the vicinity of the candidate region by performing the aforementioned processing procedure.

In a case in which the obstacle detection section 402 has detected an obstacle in the candidate region, a mark indicating that the vehicle cannot enter the candidate region is displayed in the bird's-eye view image data in the embodiment in a manner similar to that in the first embodiment.

Note that an example in which the bird's-eye view image generation section 902 reads a captured image data item captured at the closest position to the candidate region, the selection of which has been received, on the basis of the position data associated with the captured image data items stored in the captured image storage section 901 and the bird's-eye view image data is generated from the captured image data item has been described in the embodiment. However, the embodiment is not limited to the method of reading the captured image data item captured at the closest position to the candidate region, the selection of which has been received, and any captured image may be employed as a reading target as long as the candidate region appears in an appropriate range. That is, the bird's-eye view image data may be generated on the basis of the position data indicating the position in the vicinity of the candidate region, the selection of which has been received, and the plurality of captured image data items associated in the captured image storage section 901.

Third Embodiment

The example in which the entire candidate region is displayed by expanding the display range of the bird's-eye view image data has been described in the aforementioned embodiment. However, the aforementioned embodiment is not intended to limit a method of allowing the driver to ascertain the condition of the candidate region to the method of widening the display range of the bird's-eye view image data. Thus, an example in which a captured image data items obtained by capturing images in a direction in which a candidate region is present are displayed will be described in a third embodiment.

Figure 12:
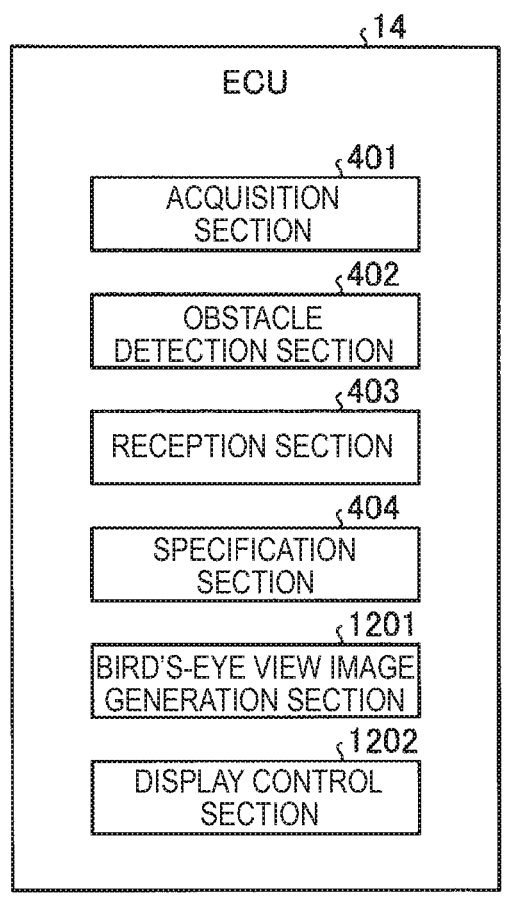
FIG. 12 is a diagram illustrating, as an example, a software configuration that is realized by an ECU according to a third embodiment.

FIG. 12 is a diagram illustrating, as an example, a software configuration that is realized by an ECU 14 according to the third embodiment. As illustrated in FIG. 12, the ECU 14 according to the third embodiment includes a bird's-eye view image generation section 1201 and a display control section 1202 changed to perform processing that is different from that executed by the bird's-eye view image generation section 405 and the display control section 406 in the configuration according to the first embodiment.

The bird's-eye view image generation section 1201 converts captured image data items acquired by the acquisition section 401 and generates bird's-eye view image data with reference to a virtual viewpoint. The bird's-eye view image generation section 1201 according to the embodiment does not reproduce bird's-eye view image data even in a case in which the reception section 403 has received selection of a candidate region.

The display control section 1202 displays captured image data items including the candidate region, the selection of which has been received by the reception section 403, from among the captured image data items acquired by the acquisition section 401 along with the bird's-eye view image data.

Figure 13:
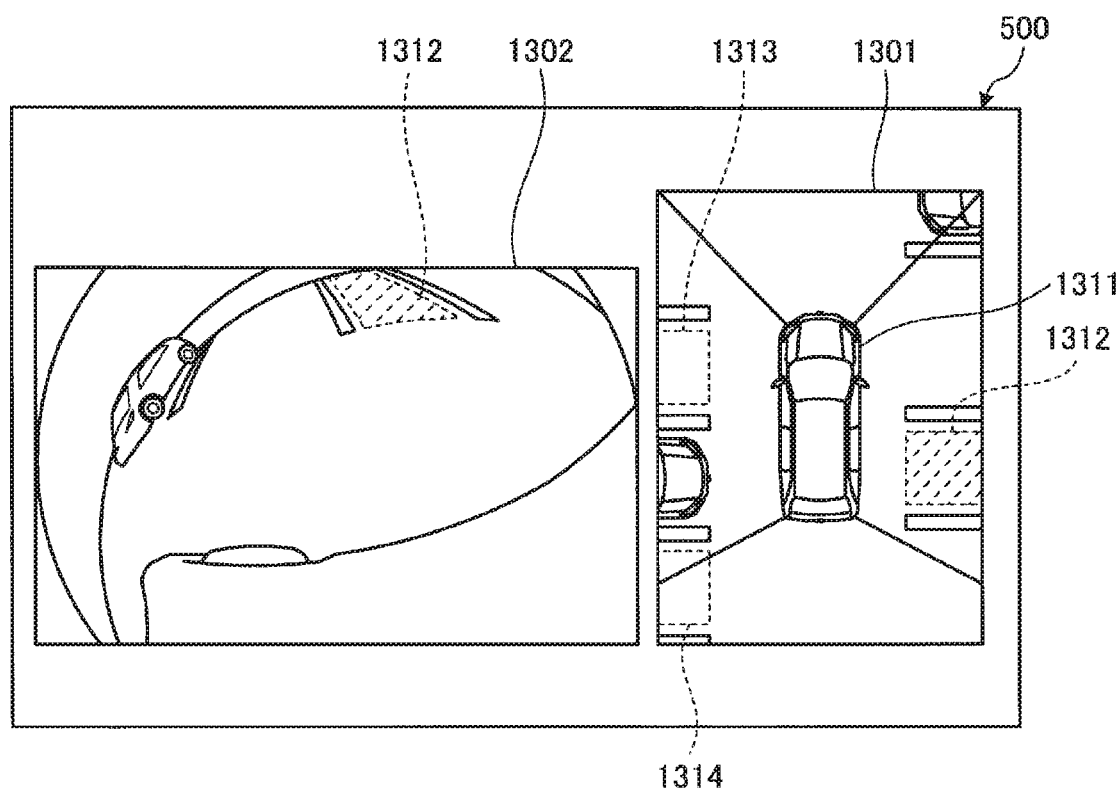
FIG. 13 is a diagram illustrating an example of a screen that is displayed by a display control section according to the third embodiment.

FIG. 13 illustrates an example of a screen displayed by the display control section 1202. In the example illustrated in FIG. 13, bird's-eye view image data 1301 and a captured image data item 1302 are displayed in the display region 500 of the display device 8. The bird's-eye view image data 1301 represents the surroundings of the vehicle 1 with reference to an icon 1311 indicating the vehicle 1. Further, candidate regions 1312 to 1314 are displayed in a selectable manner in the bird's-eye view image data 1301.

The example of the screen illustrated in FIG. 13 is an example in which the reception section 403 has received selection of the candidate region 1312. The captured image data item 1302 including the candidate region 1312 is displayed.

As illustrated in FIG. 13, the driver can ascertain the condition of the candidate region 1312 as a target of the parking of the vehicle 1 by the captured image data item including the candidate region 1312, the selection of which has been received, being displayed.

The display processing during the parking assistant according to the embodiment are similar to that in the flowchart illustrated in FIG. 8 other than that the display control section 1202 displays the captured image data item including the candidate region, the selection of which has been received, and the bird's-eye view image data instead of the processing in S811 and S812, and description thereof will be omitted.

According to the embodiment, it is possible to ascertain the condition of the candidate region and thereby to improve safety by displaying the captured image data item including the candidate region.

Fourth Embodiment

The example in which the current captured image data items captured by the imaging sections 15 are displayed has been described in the third embodiment. However, the third embodiment is not limited to the display of the current captured image data items. Thus, an example in which captured image data items captured in the past are displayed will be described in a fourth embodiment.

Figure 14:
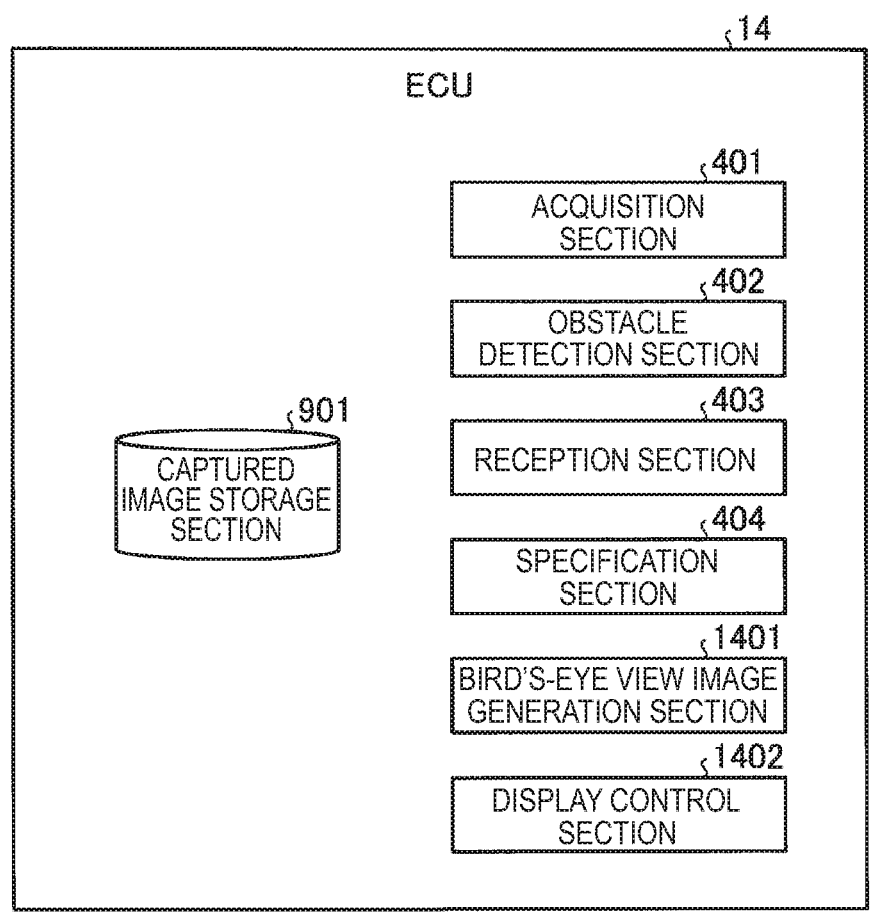
FIG. 14 is a diagram illustrating, as an example, a software configuration that is realized by an ECU according to a fourth embodiment.

FIG. 14 is a diagram illustrating, as an example, a software configuration that is realized by an ECU 14 according to the fourth embodiment. As illustrated in FIG. 14, the ECU 14 according to the fourth embodiment includes a bird's-eye view image generation section 1401 and a display control section 1402 changed to perform processing that is different from that executed by the bird's-eye view image generation section 902 and the display control section 406 in the configuration according to the second embodiment.

The bird's-eye view image generation section 1401 converts captured image data items acquired by the acquisition section 401 and generates bird's-eye view image data with reference to a virtual viewpoint.

The display control section 1402 displays the captured image data item that has been captured at the closest position to the candidate region, the selection of which has been received by the reception section 403 and includes the candidate region from among the captured image data items stored in the captured image storage section 901 along with the bird's-eye view image data.

Figure 15:
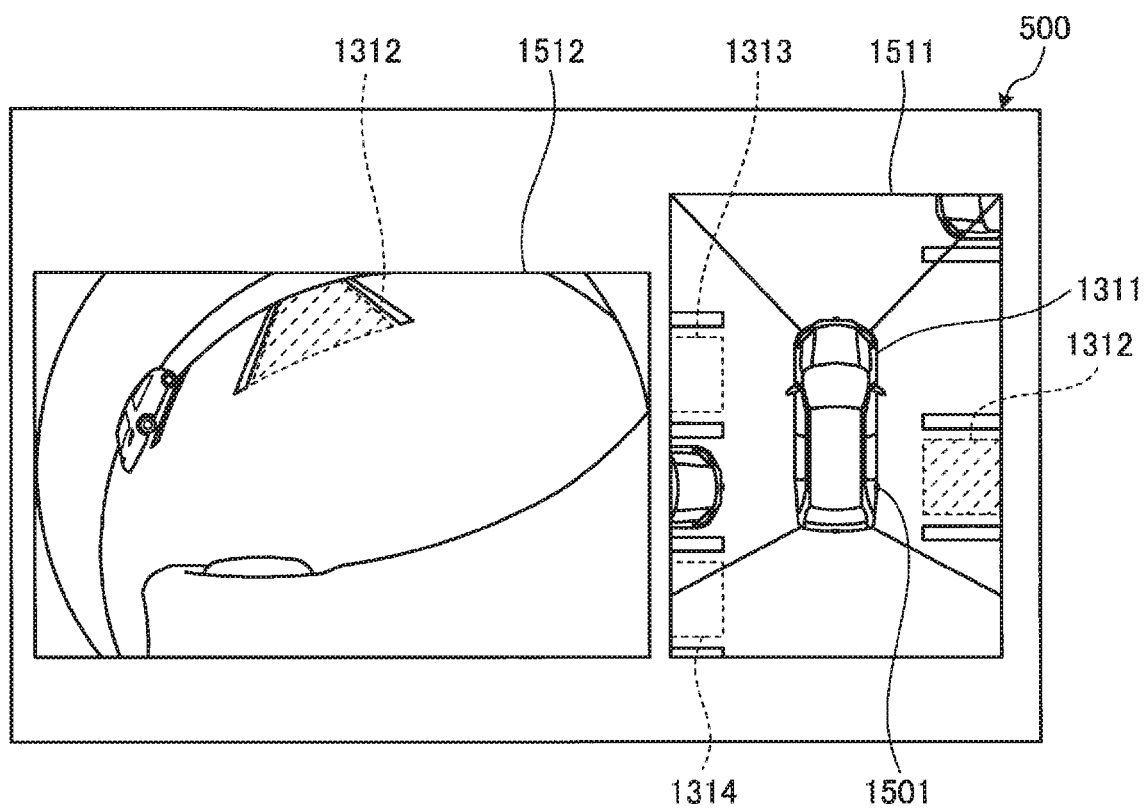
FIG. 15 is a diagram illustrating an example of a screen that is displayed by a display control section according to the fourth embodiment.

FIG. 15 illustrates an example of a screen that is displayed by the display control section 1402. In the example illustrated in FIG. 15, a bird's-eye view image data 1511 and a captured image data item 1512 are displayed in the display region 500 of the display device 8. The bird's-eye view image data 1511 represents the surroundings of the vehicle 1 with reference to the icon 1311 indicating the vehicle 1. Further, candidate regions 1312 to 1314 are represented in a selectable manner in the bird's-eye view image data 1511.

The example of the screen illustrated in FIG. 15 is an example in which the reception section 403 has received selection of the candidate region 1312. Thus, the captured image data item 1512 that has been captured at the closest position 1501 to the candidate region 1312 when the vehicle 1 is traveling and includes the candidate region 1312 is displayed.

The driver can ascertain the condition of the candidate region 1312 as a target of parking of the vehicle 1 by the captured image data item 1512 including the candidate region 1312, the selection of which has been received, being displayed as illustrated in FIG. 15.

The display processing during the parking assistant according to the embodiment is similar to that in the flowchart illustrated in FIG. 11 other than that the bird's-eye view image generation section 1401 reads a captured image data item captured at a position close to the candidate region, the reception of which has been selected, and including the candidate region from the captured image storage section 901 and the display control section 1202 displays the read captured image data item and the bird's-eye view image data instead of the processing in S1111 to S1113 in FIG. 11, and description thereof will be omitted.

In a case in which an obstacle detected by the obstacle detection section 402 is included in the candidate region, a mark indicating that the vehicle 1 cannot enter the candidate region where the obstacle has been detected is displayed in the bird's-eye view image data in the embodiment in a manner similar to that in the aforementioned embodiments. In this manner, it is possible to allow the driver to recognize that the vehicle 1 cannot enter the candidate region due to presence of the obstacle.

The display control section 1402 according to the embodiment may display a mark indicating that the vehicle 1 cannot enter the candidate region in the captured image data item within a display range corresponding to the candidate region where the obstacle has been detected. In this manner, it is possible to ascertain the current condition even in a case in which the captured image data items captured in the past are displayed.

Fifth Embodiment

The example in which the captured image data items are displayed in order to allow the driver to ascertain the condition of the candidate region has been described in the fourth embodiment. However, since the captured image data items captured by the imaging sections 15 are captured by wide-angle lenses or fisheye lenses, distortion has occurred. Thus, a case in which distortion correction is performed on the captured image data items will be described in a fifth embodiment.

Figure 16:
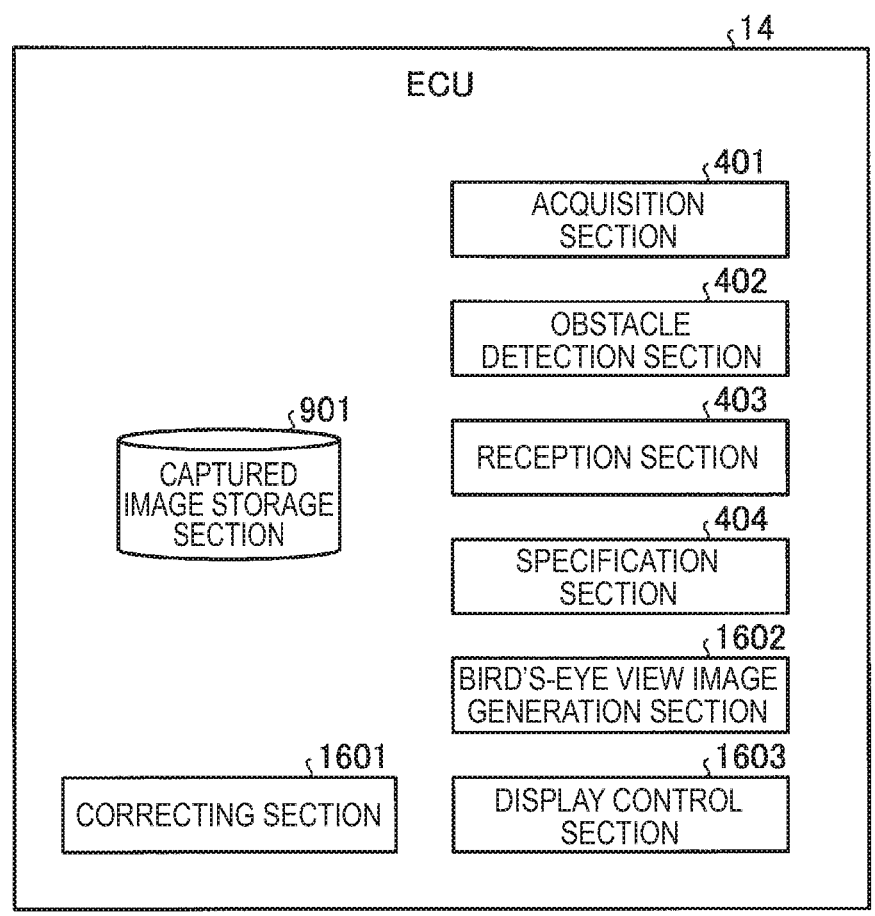
FIG. 16 is a diagram illustrating, as an example, a software configuration that is realized by an ECU according to a fifth embodiment.

FIG. 16 is a diagram illustrating, as an example, a software configuration that is realized by an ECU 14 according to a fifth embodiment. As illustrated in FIG. 16, the ECU 14 according to the fifth embodiment includes a correcting section 1601 additionally provided and includes a bird's-eye view image generation section 1602 and a display control section 1603 changed to perform processing that is different from that executed by the bird's-eye view image generation section 1401 and the display control section 1402 in the configuration according to the fourth embodiment.

The bird's-eye view image generation section 1602 converts captured image data items acquired by the acquisition section 401 and generates bird's-eye view image data with reference to a virtual viewpoint.

The correcting section 1601 performs distortion correction on the captured image data item that has been captured at the closest position to the candidate region, the selection of which has been received by the reception section 403 and that includes the candidate region from among the captured image data items stored in the captured image storage section 901 in order to remove distortion of the candidate region.

The display control section 1603 displays the captured image data item after the distortion correction performed by the correcting section 1601 along with the bird's-eye view image data.

Figure 17:
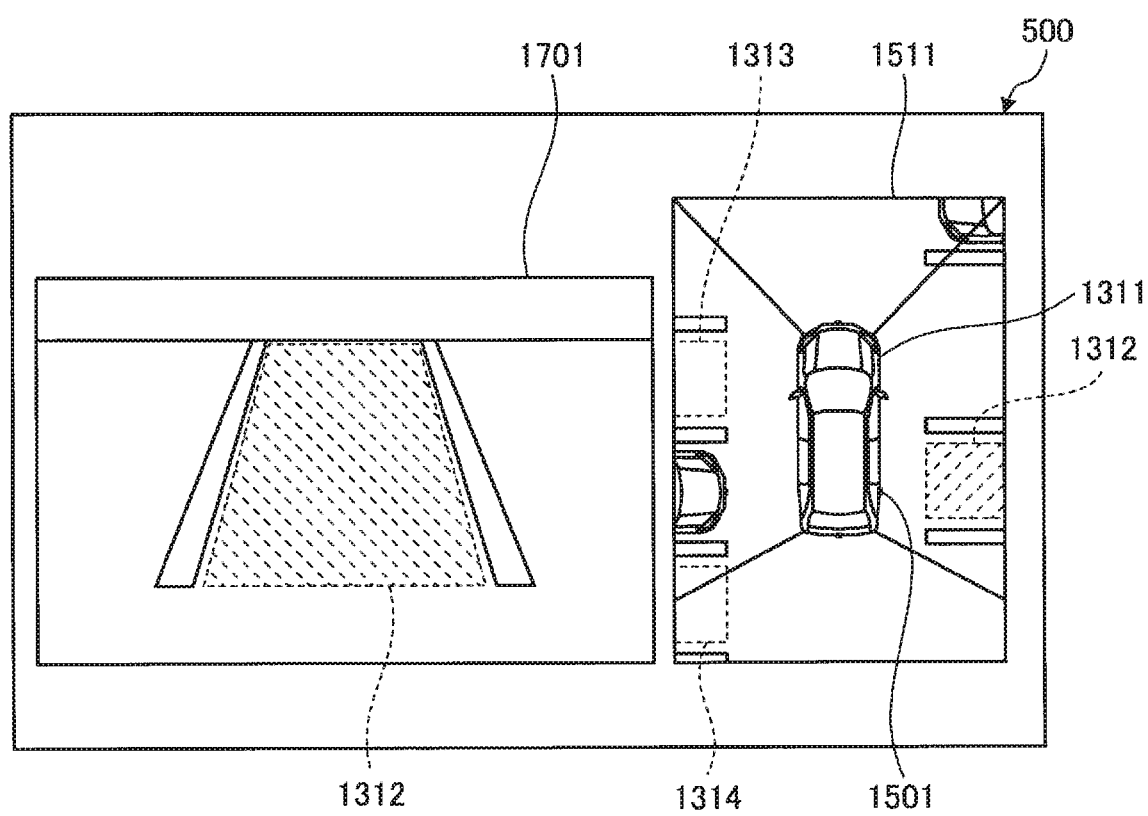
FIG. 17 is a diagram illustrating an example of a screen that is displayed by a display control section according to the fifth embodiment.

FIG. 17 illustrates an example of a screen that is displayed by the display control section 1603. In the example illustrated in FIG. 17, bird's-eye view image data 1511 and a captured image data item 1701 are displayed in the display region 500 of the display device 8. The bird's-eye view image data 1511 represents the surroundings of the vehicle 1 with reference to the icon 1311 indicating the vehicle 1 in a manner similar to that in the fourth embodiment. Further, the candidate regions 1312 to 1314 are represented in a selectable manner in the bird's-eye view image data 1511.

The example of the screen illustrated in FIG. 17 is assumed to be an example in which the reception section 403 has received selection of the candidate region 1312. Thus, the captured image data item 1701, which has been captured at the closest position 1501 to the candidate region 1312 during traveling of the vehicle 1, on which the distortion correction has been performed, is displayed.

As illustrated in FIG. 17, the driver can ascertain the condition of the candidate region 1312 as a target of parking of the vehicle 1 by the captured image data item including the candidate region 1312, from which the distortion has been removed, being displayed.

Processing that is similar to that in the fourth embodiment is performed in the embodiment other than that distortion correction is performed on the captured image data item, and description will be omitted.

According to the first to fifth embodiments, it is possible for the driver to ascertain the condition of the target region as a target of parking and to thereby easily determine whether or not to park in the candidate region as described above. In this manner, it is possible to improve safety.

A display control device according to an aspect of this disclosure includes, as an example: an acquisition section that acquires a plurality of captured image data items from a plurality of imaging sections that image a surrounding region of a vehicle; a display control section that displays first bird's-eye view image data representing surroundings of the vehicle from a bird's eye viewpoint above the vehicle, which has been generated on the basis of the plurality of captured image data items acquired by the acquisition section; and a specification section that specifies a candidate region where the vehicle is to be parked in the surrounding region that is present in a side direction of the vehicle, the surrounding region having been imaged as the captured image data items, in which the display control section displays second bird's-eye view image data with a wider display range in the side direction of the vehicle in which the candidate region specified by the specification section is present as compared with the first bird's-eye view image data. Accordingly, it is possible to ascertain a condition of the candidate region and to thereby make it easy for a driver to determine whether or not to park the vehicle in the candidate region.

As an example, the display control device according to the aspect of this disclosure may further include: a reception section that receives selection of a candidate region as a target of display from among a plurality of candidate regions in a case in which the plurality of candidate regions are specified by the specification section, and the display control section may display second bird's-eye view image data with a wider display range in the side direction of the vehicle in which the candidate region, the selection of which has been received by the reception section, is present as compared with the first bird's-eye view image data. Accordingly, it is possible to display a candidate region that the driver desires in a case in which the plurality of candidate regions are present and to thereby make it easy for the driver to determine whether or not to park the vehicle in the candidate regions.

As an example, the display control device according to the aspect of this disclosure may further include: a storage section that stores the plurality of captured image data items acquired by the acquisition section in association with position data indicating where the captured image data items have been captured, and the display control section may display the second bird's-eye view image data that has been generated on the basis of the position data indicating a position in the vicinity of the candidate region, the selection of which has been received by the reception section, and the plurality of captured image data items associated by the storage section. Accordingly, it is possible for the driver to check a condition of the desired candidate region by displaying the bird's-eye view image data that is suitable for checking the candidate region and to thereby make it easy for the driver to determine whether or not to park the vehicle in the candidate region.

As an example, in the display control device according to the aspect of this disclosure, the storage section may store the plurality of captured image data items and the position data indicating a position of the vehicle when the plurality of captured image data items have been captured in an associated manner, and the display control section may display display data indicating a position of the vehicle in the past indicated by the position data and display data indicating a current position of the vehicle in the second bird's-eye view image data.

As an example, in the display control device according to the aspect of this disclosure, the acquisition section may further acquire a result of detecting an object that is present in the surrounding region of the vehicle from a detection section, and in a case in which an object is present in the candidate region on the basis of the result of the detection, the display control section may further display the second bird's-eye view image data that includes display data indicating that parking is not allowed in the candidate region where the object is present. Accordingly, it is possible for the driver to check that there is an obstacle in the candidate region and to thereby easily determine whether or not to park the vehicle in the candidate region.

A display control device according to another aspect of this disclosure includes: an acquisition section that acquires a plurality of captured image data items from a plurality of imaging sections that image a surrounding region of a vehicle; a display control section that displays bird's-eye view image data representing an external environment from a bird's eye viewpoint above the vehicle, which has been generated on the basis of the plurality of captured image data items acquired by the acquisition section; and a specification section that specifies a candidate region where the vehicle is to be parked in the surrounding region that is present in a side direction of the vehicle, the surrounding region having been represented in the bird's-eye view image data, in which the display control section further displays the captured image data items that include the candidate region specified by the specification section. Accordingly, it is possible to ascertain a condition of the candidate region and to thereby make it easy for the driver to determine whether or not to park the vehicle in the candidate region.

As an example, the display control device according to the aspect of this disclosure may further include: a reception section that receives selection of a candidate region as a target of display from among a plurality of candidate regions in a case in which the plurality of candidate regions are specified by the specification section, and the display control section may display the captured image data items that include a display range in the side direction of the vehicle in which the candidate region, the selection of which has been received by the reception section, is present. Accordingly, in the case in which the plurality of candidate regions are present, it is possible to check a condition of the candidate region that the driver desires and to thereby make it easy for the driver to determine whether or not to park the vehicle in the candidate region.

As an example, the display control device according to the aspect of this disclosure may further include: a storage section that stores the plurality of captured image data items acquired by the acquisition section in association with position data indicating where the captured image data items have been captured, and the display control section may display the captured image data items associated with the position data indicating a position in the vicinity of the candidate region, the selection of which has been received by the reception section, in the storage section. Accordingly, it is possible to check a condition of the candidate region that the driver desires by displaying a bird's-eye view image data that is suitable for checking the candidate region and to thereby make it easy for the driver to determine whether or not to park the vehicle in the candidate region.

As an example, the display control device according to the aspect of this disclosure may further include: a correcting section that corrects distortion based on optical systems in the imaging sections for the captured image data items acquired by the acquisition section, and the display control section may further display the captured image data items that include a display range in the side direction of the vehicle in which the candidate region specified by the specification section is present and that have been corrected by the correcting section. Accordingly, it is possible to check a condition of the candidate region that the driver desires by displaying the captured image data items, on which distortion correction has been performed, and to thereby make it easy for the driver to determine whether or not to park the vehicle in the candidate region.

As an example, in the display control device according to the aspect of this disclosure, the acquisition section may further acquire a result of detecting an object that is present in the surrounding region of the vehicle from the detection section, and in a case in which an object is present in the candidate region on the basis of the result of the detection, the display control section may further display the bird's-eye view image data or the captured image data items that includes display data indicating that parking is not allowed in the candidate region where the object is present. Accordingly, it is possible for the driver to check that an obstacle is present in the candidate region and to thereby easily determine whether or not to park the vehicle in the candidate region.

Although some embodiments have been described, these examples have been proposed as examples and are not intended to limit the scope of the embodiments disclosed here. These novel embodiments can be implemented in other various forms, and various omissions, replacements, and changes can be made without departing from the gist of the embodiments disclosed here. These embodiments and modifications are included in the scope and the gist of the embodiments disclosed here and are included in the embodiments described in the claims and in a scope equivalent thereto.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A display control device comprising:
   an acquisition section that acquires a plurality of captured image data items from a plurality of imaging sections that image a surrounding region of a vehicle;
   a display control section that displays first bird's-eye view image data representing surroundings of the vehicle from a bird's eye viewpoint above the vehicle, which has been generated on the basis of the plurality of captured image data items acquired by the acquisition section; and
   a specification section that specifies a candidate region where the vehicle is to be parked in the surrounding region that is present in a side direction of the vehicle, the surrounding region having been imaged as the captured image data items,
   wherein the display control section displays second bird's-eye view image data with a wider display range in the side direction of the vehicle in which the candidate region specified by the specification section is present as compared with the first bird's-eye view image data,
   wherein the second bird's-eye view image data displayed by the display control section entirely includes the candidate region.

2. The display control device according to claim 1, further comprising:
   a reception section that receives selection of the candidate region as a target of display from among a plurality of candidate regions in a case in which the plurality of candidate regions are specified by the specification section,
   wherein the display control section displays second bird's-eye view image data with the wider display range in the side direction of the vehicle in which the candidate region, the selection of which has been received by the reception section, is present as compared with the first bird's-eye view image data.

3. The display control device according to claim 2, further comprising:
   a storage section that stores the plurality of captured image data items acquired by the acquisition section in association with position data indicating where the captured image data items have been captured,
   wherein the display control section displays the second bird's-eye view image data that has been generated on the basis of the position data indicating a position in the vicinity of the candidate region, the selection of which has been received by the reception section, and the plurality of captured image data items associated by the storage section.

4. The display control device according to claim 3,
   wherein the storage section stores the plurality of captured image data items and the position data indicating a position of the vehicle when the plurality of captured image data items have been captured in an associated manner, and
   the display control section displays display data indicating a position of the vehicle in the past indicated by the position data and display data indicating a current position of the vehicle in the second bird's-eye view image data.

5. The display control device according to claim 1,
   wherein the acquisition section further acquires a result of detecting an object that is present in the surrounding region of the vehicle from a detection section, and
   wherein in a case in which an object is present in the candidate region on the basis of the result of the detection, the display control section further displays the second bird's-eye view image data that includes display data indicating that parking is not allowed in the candidate region where the object is present.

6. The display control device according to claim 2, wherein the display control section switches a display from the first bird's-eye view image data to the second bird's-eye view image data when the reception section receives the selection of the candidate region.

* * * * *